Oct. 26, 1948.  C. J. HUDSON  2,452,378
CABLE REEL
Filed Oct. 29, 1945  2 Sheets-Sheet 1
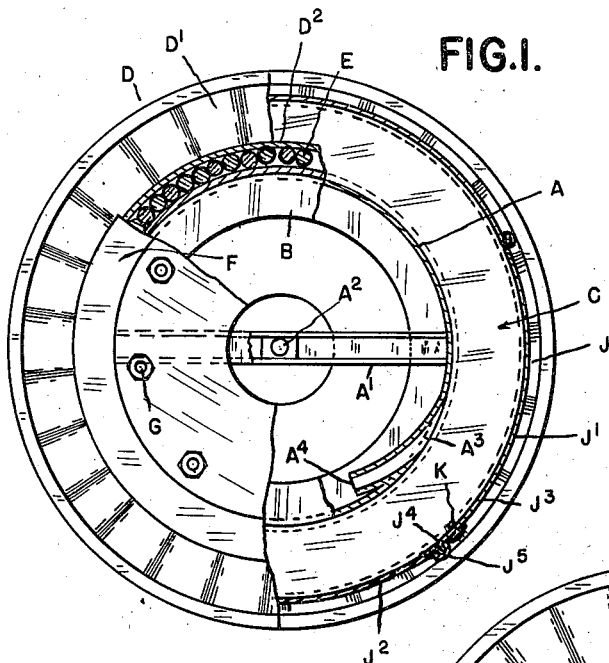
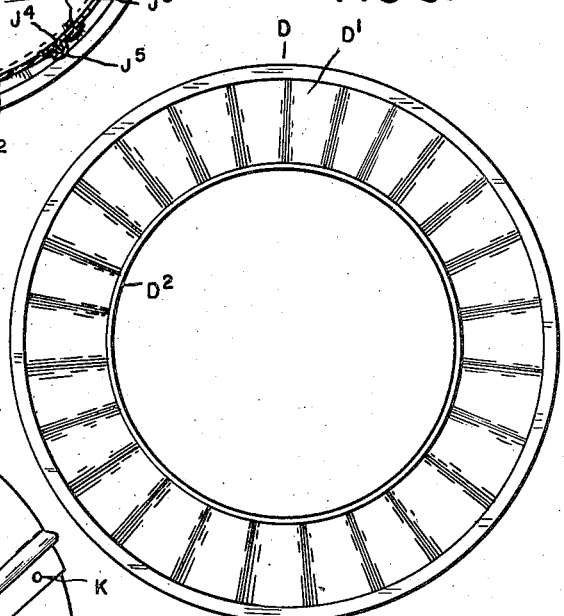
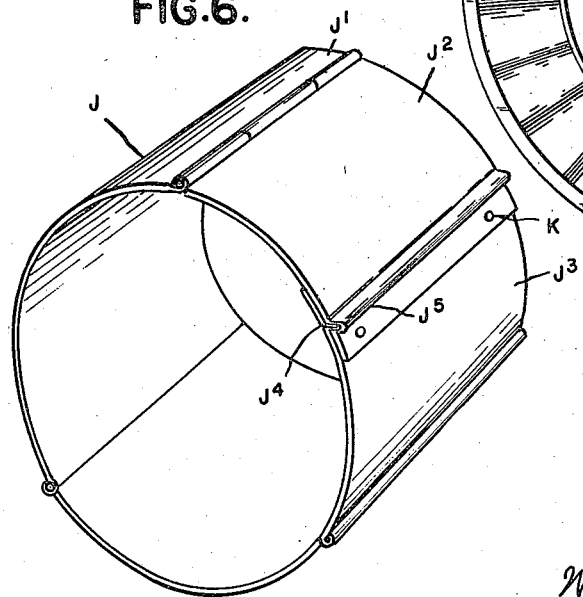
INVENTOR.
CHARLES J. HUDSON
BY
Whittemore Hulbert & Belknap
ATTORNEYS Oct. 26, 1948.   C. J. HUDSON   2,452,378
CABLE REEL
Filed Oct. 29, 1945   2 Sheets-Sheet 2

INVENTOR.
CHARLES J. HUDSON
BY
Whittemore Hulbert & Belknap
ATTORNEYS

Patented Oct. 26, 1948

2,452,378

UNITED STATES PATENT OFFICE 2,452,378

CABLE REEL

Charles J. Hudson, Detroit, Mich.

Application October 29, 1945, Serial No. 625,311

9 Claims. (Cl. 242—77)

The invention relates to reels and more particularly to constructions adapted for cable reels.

It is one of the objects of the invention to obtain a comparatively simple construction which can be knocked down for shipment when not in use.

It is a further object to obtain a construction in which the wheels are independently revoluble from the drum on which the cable is wound with an antifriction bearing therebetween.

It is a further object to provide means for enclosing the cable when wound upon the drum, said means being easily detachable and replaceable. With these and other objects in view the invention consists in the construction as hereinafter set forth.

In the drawings:

Fig. 1 is a central cross section through the reel partly in elevation and partly in section in a different plane;

Fig. 3 is a side elevation of one of the wheels detached;

Fig. 6 is a perspective view of the detachable cover; and

Figure 2:
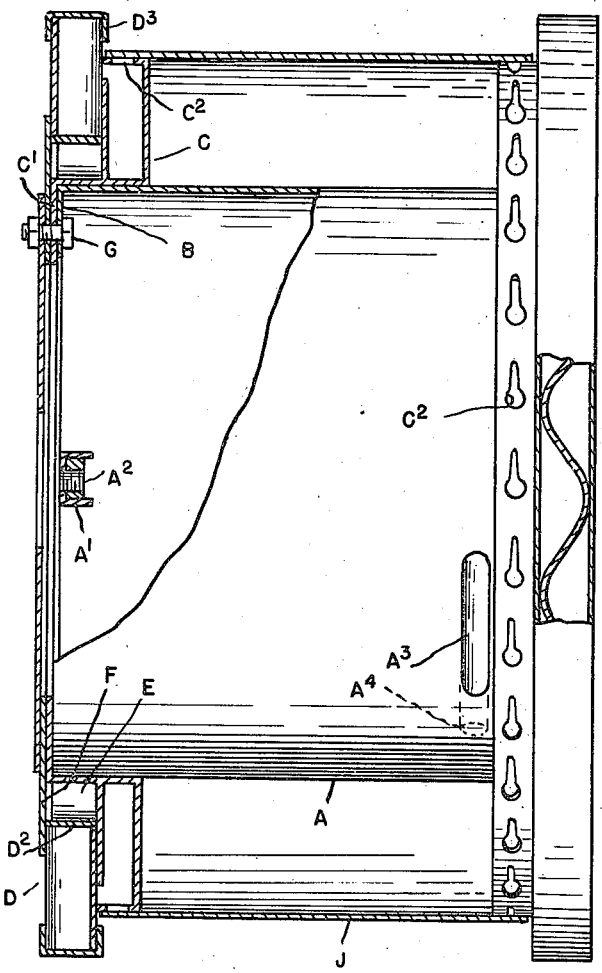
Fig. 2 is a plane view partly in longitudinal section.
Figure 7:
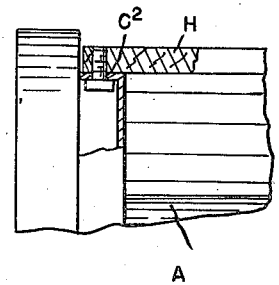
Fig. 7 is a view similar to a portion of Fig. 2 showing a modified construction.
Figure 4:
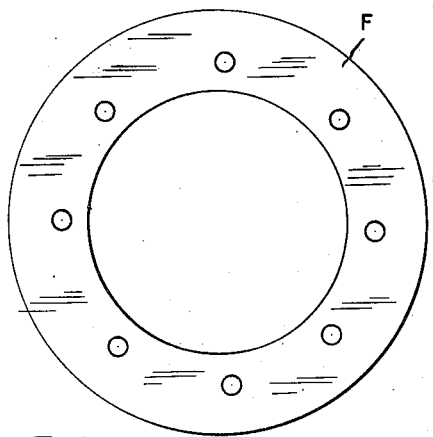
Fig. 4 is an elevation of the securing plate for the wheels.
Figure 5:
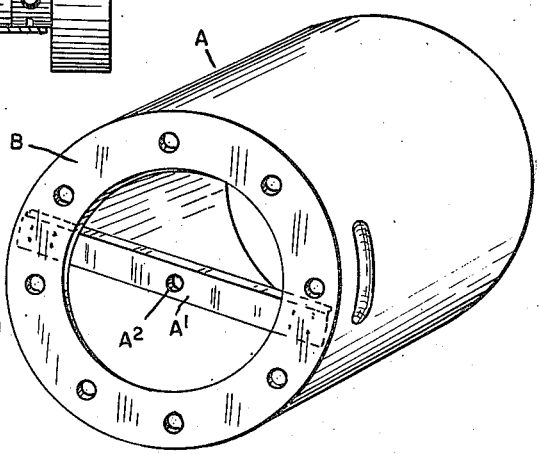
Fig. 5 is a perspective view of the drum detached.

A is a drum member which is provided at its opposite ends with inturned annular flanges B. C is a side member for the reel which has a sleeve portion adapted to be sleeved over an end portion of the drum A and is provided with an inturned flange C' adjacent to the flange B. D is a wheel member formed of pressed sheet metal and having a circumferentially corrugated body portion D', an inner annular flange or raceway $D^2$ and a peripheral flange $D^3$. The annular flange $D^2$ is of a larger radius than the portion of the member C which is sleeved upon the drum so as to leave an annular space between these members. This space is filled with a series of rollers E which are retained by an annular disc flange F overlapping the same and the portions B and C'. These parts are then secured together by a series of bolts G. The side member C is preferably hollow as shown and its peripheral portion is provided with a series of keyhole slots $C^2$ which may be used, if desired, for securing wooden strips H constituting a cover for the cable on the reel. I may, however, substitute for said strips a metallic cover member J formed of a plurality of segments J' hinged to each other so as to permit wrapping the cover about the cable on the reel. The end sections $J^2$ and $J^3$ of this cover overlap each other and have a tongue $J^4$ on the one and a groove $J^5$ on the other for engagement with each other. They may then be secured to the periphery of the member C by screws K. The drum A is preferably provided near its opposite ends with channel-shaped cross bars A' apertured at $A^2$ for the insertion of a shaft on which the reel as a whole may be turned. The drum is also provided with a channel $A^3$ terminating in an aperture $A^4$ through which the end of the cable may be inserted before winding upon the drum.

With the construction as described, the wheels D by reason of the antifriction rollers E are freely revoluble independently of the drum on the end portion thereof. Also when the wheels D are held stationary, the drum is freely revoluble. This facilitates the winding and the unwinding of the cable on the reel. After the full length of cable is wound upon the reel, a cover may be engaged therewith formed either of the separate wooden strips H, each of which is provided with lugs for engaging the keyhole slots $C^2$, or by the hinge cover shown in Fig. 6. After the cable is removed from the reel, the latter may be knocked down for reshipment. Thus, by detaching the bolts G, the sides C together with the wheels D may be removed from the drum A. The retaining plate F may then be secured to the flange B by the bolts G so as to hold the members C and D together with the rollers D in engagement with each other.

Some of the advantages of the construction are:

(1) The structure may, if desired, be formed completely of metal parts.

(2) Also, it may be made air-tight and oil-tight which is advantageous when shipping certain types of cable.

(3) As the wheels are revoluble independently of each other, this facilitates moving the reel about in any direction.

(4) The reel may also be used to "pay out" cable in ditch work inasmuch as the ground wheels revolve independently of the revolution of the drum.

What I claim as my invention is:

1. A cable reel comprising a drum, side plates detachably secured to the opposite ends of said drum, and ground engaging wheels independently revolubly mounted on said side plates.

2. A cable reel comprising a drum having inturned flanges at its opposite ends, side members for opposite ends of said drum each having a sleeve portion for directly engaging the drum and an inturned flange adjacent to the flange on the drum, a wheel adjacent to said side member having an annular inner flange of a radius greater than that of said sleeve portion, and rollers filling the space between said annular flange and said sleeve.

3. A cable reel comprising a drum having inturned flanges at its opposite ends, side members for opposite ends of said drum each having a sleeve portion for directly engaging the drum and an inturned flange adjacent to the flange on the drum, a wheel adjacent to said side member having an annular inner flange of a radius greater than that of said sleeve portion, rollers filling the space between said annular flange and said sleeve, an annular flange member overlapping said rollers to retain the same, and means for clamping all of said flanges together.

4. A cable reel comprising a drum having inturned annular flanges at the opposite ends thereof, side members for opposite ends of said drum each having a sleeve portion fitting over said drum, an inturned flange portion, a pressed sheet metal wheel member having a circumferentially corrugated body portion, an inner annular flange of greater radius than that of said sleeve and a peripheral flange, rollers filling the space between said inner annular flange and sleeve, a retaining member for said rollers, and means for clamping said retaining member and the flanges of said drum and sleeve to each other.

5. A cable reel comprising a cylindrical drum, annular side members detachably mounted on opposite ends of said drum, annular ground engaging wheel members adjacent to said side members, and a roller bearing mounting for said wheel members on said side members to be independently revoluble thereon.

6. A cable reel comprising a cylindrical drum, and combined side member and ground engaging wheel member units detachably independently revoluble mounted on opposite ends of said drum, the wheel member portion of each unit having an antifriction bearing on the side member portion thereof.

7. A cable reel comprising a cylindrical drum, annular side members mounted upon opposite ends of said drum, each having a sleeve portion fitting over said drum with a portion of said sleeve constituting a race member, an annular wheel member adjacent to the outer face of said side member surrounding and spaced from said race member, a series of rollers between said wheel member and race member, and a retaining flange for securing said rollers and wheel member to said side member.

8. A cable reel comprising a drum, side members detachably mounted on opposite end portions of said drum, and ground engaging wheel members revolubly mounted on said side members to be independently removable and replaceable therewith.

9. A cable reel comprising a drum having inturned flanges at its opposite ends, side members for opposite ends of said drum each having a sleeve portion for directly engaging the drum and an inturned flange adjacent to the flange on the drum and a ground engaging wheel revolubly mounted on said sleeve portion, and means for detachably securing said inturned flanges to each other.

CHARLES J. HUDSON.

REFERENCES CITED

The following references are of record in the file of this patent:

UNITED STATES PATENTS

| Number | Name | Date |
|---|---|---|
| 1,561,160 | Ingenthron | Nov. 10, 1925 |
| 1,661,991 | Benit | Mar. 6, 1928 |
| 1,804,332 | Gentiluomo | May 5, 1931 |
| 2,110,624 | Hayward | May 8, 1938 |
| 2,273,274 | Krouse | Feb. 17, 1942 |